United States Patent [19]

Paul

[11] Patent Number: 4,684,498
[45] Date of Patent: Aug. 4, 1987

[54] GUIDE THIMBLE CAPTURED LOCKING TUBE IN A RECONSTITUTABLE FUEL ASSEMBLY

[75] Inventor: Gary E. Paul, Monroeville, Pa.

[73] Assignee: Westinghouse Electric Corp., Pittsburgh, Pa.

[21] Appl. No.: 717,991

[22] Filed: Mar. 29, 1985

[51] Int. Cl.[4] ............................................. G21C 3/32
[52] U.S. Cl. .................................. 376/446; 376/327; 376/353; 376/449; 285/222; 411/338
[58] Field of Search .............. 376/446, 444, 353, 463, 376/449, 327; 411/338; 285/222

[56] References Cited

U.S. PATENT DOCUMENTS 4,535,523  8/1985  Leclercq ........................... 376/446

FOREIGN PATENT DOCUMENTS 0041014 12/1981 European Pat. Off. .
0098774  1/1984 European Pat. Off. .
0140588  5/1985 European Pat. Off. ............ 376/446
2493024  4/1982 France .
2529704  1/1984 France .
2533741  3/1984 France .
2129189  5/1984 United Kingdom ................ 376/446

*Primary Examiner*—Donald P. Walsh

[57] ABSTRACT

In a reconstitutable fuel assembly, a top nozzle attaching structure for mounting the top nozzle adapter plate in releasable locking engagement upon the guide thimble upper end portions includes several improved features. First, each locking tube is mounted within the guide thimble upper end portion for movement between an upper locking position wherein the adapter plate and guide thimble upper end portion are maintained in locking engagement and a lower unlocking position wherein the adapter plate is releasable from the guide thimble upper end portion. Also, cooperating means are defined on the locking tube and the guide thimble for retaining the locking tube at either of its upper or lower positions. The guide thimble cooperating means includes a pair of upper and lower circumferential bulges defined on the guide thimble upper end portion below the adapter plate. The bulges are axially spaced from one another such that the upper bulge is located to retain the locking tube at its upper locking position and the lower bulge is located to retain the locking tube at its lower unlocking position. The locking tube cooperating means includes a circumferential bulge defined on a lower portion of the locking tube which is seatable in either of the bulges of the guide thimble and several slots defined in the locking tube which extend upward along its lower portion from a lower edge thereof. The slots allow radial compression and expansion of the lower portion of the locking tube for facilitating its movement between and positioning at its upper and lower positions.

12 Claims, 7 Drawing Figures

GUIDE THIMBLE CAPTURED LOCKING TUBE IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly With A Removable Top Nozzle" by John M. Shallenberger et al, assigned U.S. Ser. No. 644,758 and filed Aug. 27, 1984, which is a continuation-in-part of U.S. Ser. No. 537,775, filed Sept. 30, 1983, now abandoned.

2. "Locking Tube Removal And Replacement Tool And Method In A Reconstitutable Fuel Assembly" by John M. Shallenberger et al, assigned U.S. Ser. No. 670,418 and filed Nov. 9, 1984.

3. "Top Nozzle Removal And Replacement Fixture And Method In A Reconstitutable Fuel Assembly" by John M. Shallenberger et al, assigned U.S. Ser. No. 670,729 and filed Nov. 13, 1984.

4. "Locking Tube Removal Fixture And Method In A Reconstitutable Fuel Assembly" by John M. Shallenberger et al, assigned U.S. Ser. No. 695,762 and filed Jan. 28, 1985.

5. "Locking Tube Insertion Fixture And Method In A Reconstitutable Fuel Assembly" by John M. Shallenberger et al, assigned U.S. Ser. No. 689,656 and filed Jan. 8, 1985.

6. "Reusable Locking Tube In A Reconstitutable Fuel Assembly" by John M. Shallenberger et al, assigned U.S. Ser. No. 719,108 and filed Apr. 2, 1985.

BACKGROUND OF THE INVENTION

1. Field of the Invention

The present invention relates generally to fuel assemblies for nuclear reactors and, more particularly, is concerned with improvements for releasably locking the top nozzle on the upper ends of the control rod guide thimbles and a method of carrying out the locking and unlocking of the top nozzle to and from the guide thimbles.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array of grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of the integral assembly of guide thimbles welded to the top and bottom nozzles, it is difficult to detect and remove the failed rods.

Until recently, to gain access to these rods it was necessary to remove the affected assembly from the nuclear reactor core and then break the welds which secure the nozzles to the guide thimbles. In so doing, the destructive action often renders the fuel assembly unfit for further use in the reactor because of the damage done to both the guide thimbles and the nozzle which prohibits rewelding.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One reconstitutable fuel assembly construction, devised recently, is illustrated and described in the first U.S. patent application cross-referenced above. It incorporates an attaching structure for removably mounting the top nozzle on the upper ends of the control rod guide thimbles.

The attaching structure includes a plurality of outer sockets defined in an adapter plate of the top nozzle, a plurality of inner sockets with each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inderted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets, and thereby the attachment of the top nozzle on the upper ends of the guide thimbles.

Furthermore, to prevent inadvertent escape due to vibration forces and the like, heretofore the locking tubes have been secured in their locking positions. After insertion of the locking tubes into their locking positions within the inner sockets of the hollow upper end portions of the guide thimbles, a pair of bulges are formed in the upper portion of each locking tube. These bulges fit into the circumferential bulge in the upper end portion of the guide thimble and provide an interference fit therewith.

When reconstitution of the fuel assembly is undertaken, these locking tubes must first be removed from the top nozzle. The locking tubes must be handled as "loose parts", either individually or together using an appropriate removal fixture, which require storage, retention and accountability during performance of underwater nuclear fuel assembly reconstitution activities. Then, after the failed fuel rods have been removed and replaced and following remounting of the top nozzle, handling is again required when either the same locking tubes are reused a second time by inserting them back into the guide thimble upper ends and re-deforming them to secure them at their locking positions or a full complement of new locking tubes are inserted on the guide thimble upper ends and secure them by bulging.

This practice has a number of disadvantages. First, a large number of locking tubes must be handled and a large inventory thereof must be maintained. Second, provision must be made for disposal of the discarded irradiated locking tubes. Third, after each locking tube is inserted, a deforming operation must be carried out remotely to produce the bulges in each tube. And, fourth, an inspection of bulges must be carried out remotely to ascertain whether the bulges were made to the correct dimension. Consequently, notwithstanding the overall acceptability of the use of the above-described attaching structure in reconstitutable fuel assemblies, these recently recognized disadvantages have created a need for further improvement of the reconstitution operation so as to enhance commercial acceptance thereof.

SUMMARY OF THE INVENTION

The present invention provides a reconstitutable fuel assembly with improved features for locking the top nozzle upon and unlocking it from the guide thimbles which are designed to satisfy the aforementioned needs. The present invention introduces a push-down locking tube concept in which the locking tube is not removed from the fuel assembly guide thimbles during underwater reconstitution activities. This push-down concept improves the reconstitution operation in several ways. First, it eliminates the need to track separate pieces during the reconstitution operation. Second, it reduces the time required to reconstitute the fuel assembly by eliminating the locking tube deforming operation after remounting the top nozzle. Third, by retaining the locking tubes within the guide thimbles and reusing them, provisions are not necessary for handling and disposal of the irradiated locking tubes. To summarize, by the design change in the locking tube concept contemplated by the present invention, an easier, more trouble-free removal and remounting of the top nozzle during reconstitution is achieved which result in an overall more efficient and reliable reconstitution operation without impacting the highly desirable basic design and integrity of the top nozzle/guide thimble attaching structure described and illustrated in the first patent application cross referenced above.

Accordingly, the present invention sets forth in a reconstitutable fuel assembly including a top nozzle with an adapter plate having at least one passageway, at least one guide thimble with an upper end portion, and an attaching structure for mounting the top nozzle adapter plate in releasable locking engagement upon the guide thimble upper end portion, the improvement which comprises: (a) a push-down locking tube mounted within the guide thimble upper end portion for movement relative thereto between an upper locking position wherein the adapter plate and guide thimble upper end portion are maintained in the locking engagement and a lower unlocking position wherein the adapter plate is releasable from the guide thimble upper end portion; and (b) cooperating means defined on the locking tube and the guide thimble for retaining the locking tube at either of its upper and lower positions in the guide thimble.

More particularly, the cooperating means on the guide thimble includes a pair of upper and lower circumferential bulges defined on the guide thimble upper end portion and located below the adapter plate when the latter is in locking engagement upon the guide thimble upper end portion. The bulges are axially spaced from one another along the guide thimble upper end portion such that the upper bulge is located to retain the locking tube at its upper locking position and the lower bulge is located to retain the locking tube at its lower unlocking position.

Still further, the cooperating means on the locking tube includes a circumferential bulge defined on a lower portion of the locking tube which is seatable in either of the upper and lower circumferential bulges defined on the guide thimble upper end portion. Additionally, the locking tube cooperating means defines at least one slot in the locking tube extending axially upwardly along the lower portion of the locking tube from a lower edge thereof. The axial slot allows radial compression and expansion of the lower portion of the locking tube upon movement of the locking tube between and positioning of the tube at its upper and lower positions for seating and unseating of the circumferential bulge of the locking tube into and from the respective upper and lower circumferential bulges of the guide thimble upper end portion.

The present invention also relates to a method of locking the top nozzle adapter plate on and unlocking it from the guide thimble upper end portion, which comprises the steps of: (a) selectively moving a locking tube within the guide thimble upper end portion to an upper locking position wherein the adapter plate and guide thimble upper end portion are maintained in locking engagement; and (b) selectively moving the locking tube within the guide thimble upper end portion to a lower unlocking position displaced below the upper locking position wherein the adapter plate is releasable from the guide thimble upper end portion.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
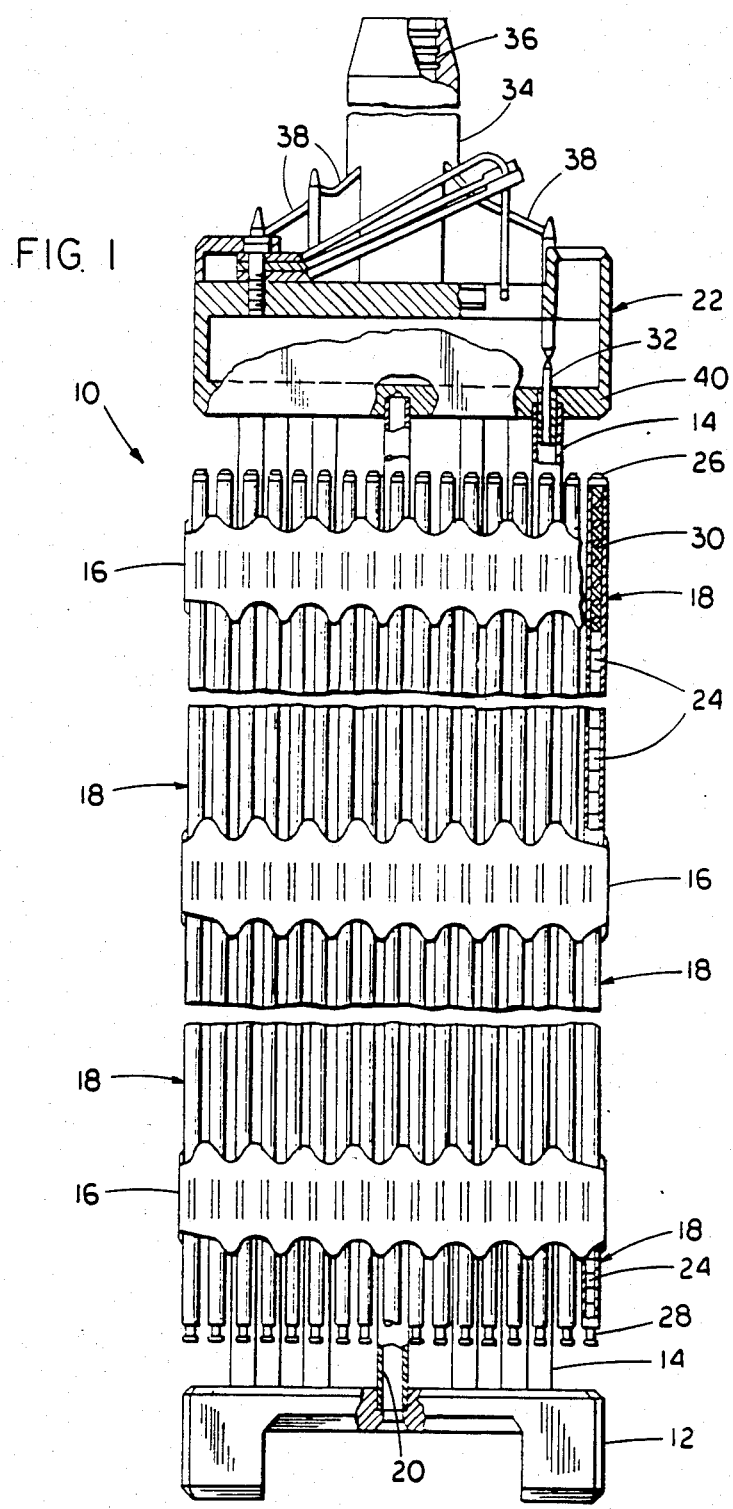
FIG. 1 is a side elevational view, with parts partially sectioned and broken away for purposes of clarity, of a reconstitutable fuel assembly employing the improved features of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14, in a manner fully described below, to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to one or more control rods 32 such that the control mechanism 34 is operable to move the control rods 32 vertically in the guide thimbles 14 to thereby control the fission process in the fuel assembly 10, all in a well-known manner.

Figure 7:
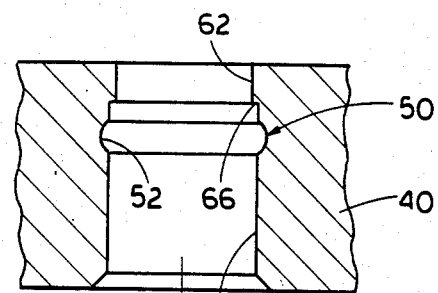
FIG. 7 is another sectional view similar to that of FIGS. 5 and 6, but now showing the top nozzle removed from the upper end portion of the guide thimble with the improved locking tube captured in the guide thimble upper end portion.
Figure 7:
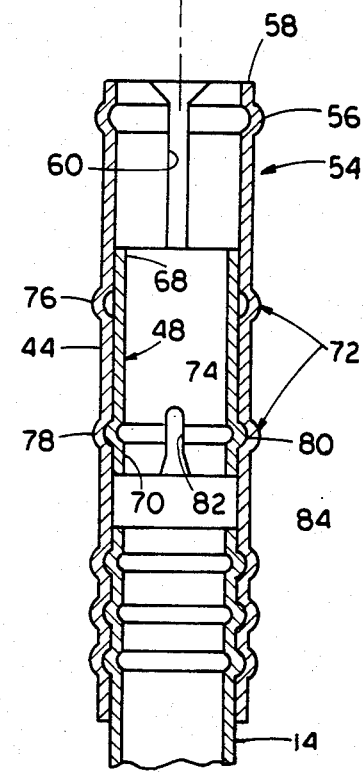

As illustrated in FIG. 1, the top nozzle 22 has a lower adapter plate 40 with a plurality of control rod passageways 42 (only one being shown) formed through the adapter plate. The control rod guide thimbles 14 have their uppermost end portions 44 coaxially positioned within the passageways 42 in the adapter plate 40. For gaining access to the fuel rods 18, the adapter plate 40 of the top nozzle 22 is removably connected to the upper end portions 44 of the guide thimbles 14 by an attaching structure, generally designated 46. The attaching structure 46, best seen in FIGS. 2 and 7, includes the improved features of the present invention. Except for certain important improved features associated with each locking tube 48 and each guide thimble upper end portion 44 which allows the locking tube to be captured in the guide thimble 14 and renders it reusable as will be discussed later, the attaching structure 46 contains features generally similar to those depicted in FIGS. 9 and 14 of the first patent application cross-referenced above. The prior features of the attaching structure 46 will be described herein to the extent necessary to facilitate an understanding of the improved features of the present invention.

TOP NOZZLE ATTACHING STRUCTURE

Figure 2:
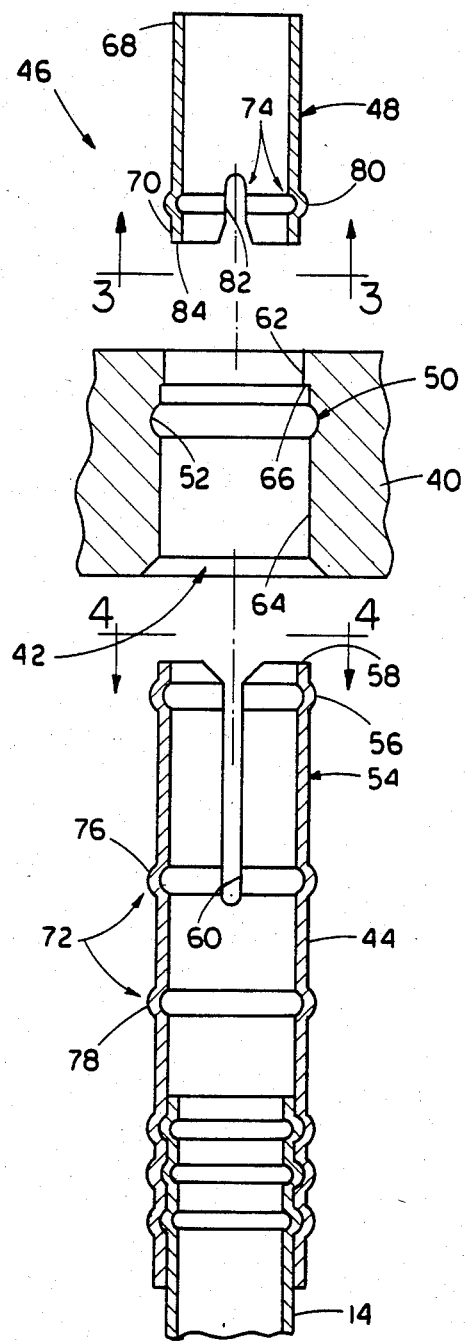
FIG. 2 is a sectioned, exploded view of the components of the attaching structure associated with the top nozzle and the guide thimbles of the reconstitutable fuel assembly and including the improved features of the present invention.
Figure 5:
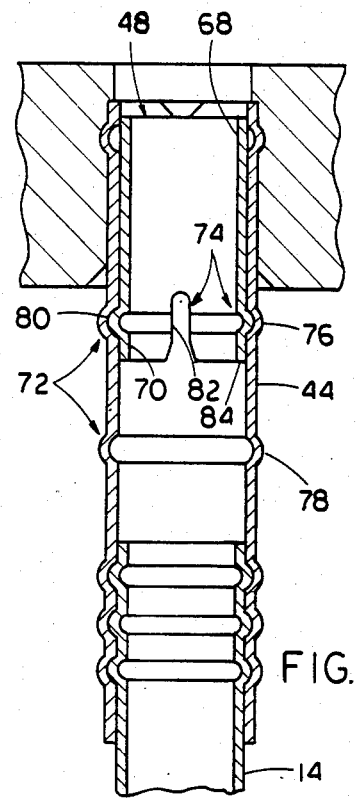
FIG. 5 is a sectional view of the components of the attaching structure of FIG. 2 being assembled together with the improved push-down locking tube being disposed in its locking position within the guide thimble upper end portion.

As best seen in FIGS. 2 and 5, the top nozzle attaching structure 46 of the reconstitutable fuel assembly 10 includes a plurality of outer sockets 50 (only one being shown) defined in the top nozzle adapter plate 40 by the plurality of passageways 42 (also only one being shown) which each contains an annular circumferential groove 52 (only one being shown), a plurality of inner sockets 54 (only one being shown) defined on the upper end portions 44 of the guide thimbles 14, and a plurality of improved push-down locking tubes 48 (only one being shown) inserted in the inner sockets 54 to maintain them in locking engagement with the outer sockets 50.

Each inner socket 54 is defined by an annular circumferential bulge 56 on the hollow upper end portion 44 of one guide thimble 14 only a short distance below its upper edge 58. A plurality of elongated axial slots 60 are formed in the upper end portion 44 of each guide thimble 14 to permit inward elastic collapse of the slotted end portion to a compressed position so as to allow the circumferential bulge 56 thereon to be inserted within and removed from the annular groove 52 via the adapter plate passageway 42. The annular bulge 56 seats in the annular groove 52 when the guide thimble end portion 44 is inserted in the adapter plate passageway 42 and has assumed an expanded position. In such manner, the inner socket 54 of each guide thimble 14 is inserted into and withdrawn from locking engagement with one of the outer sockets 50 of the adapter plate 40.

Figure 6:
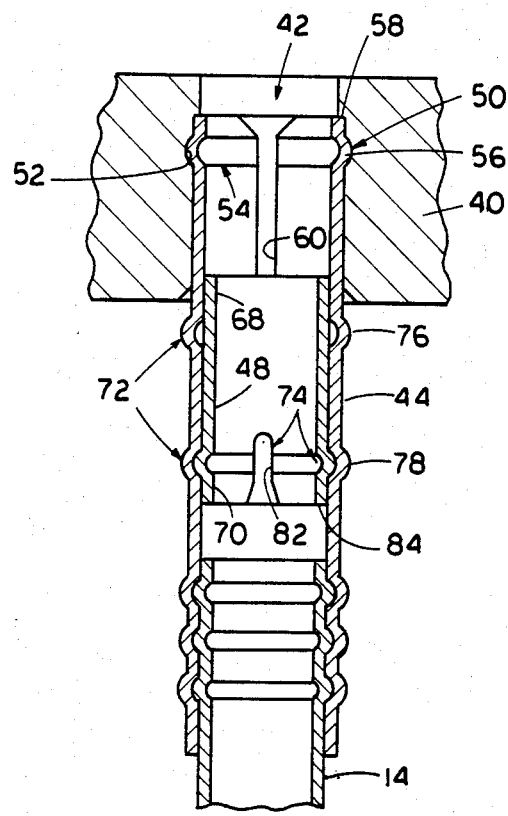
FIG. 6 is a sectional view similar to that of FIG. 5, but showing the improved push-down locking tube disposed in its unlocking position within the guide thimble upper end portion.

More particularly, the axially extending passageway 42 in the adapter plate 40 which defines the outer socket 50 is composed of an upper bore 62 and a lower bore 64. The lower bore 64 is of considerably greater axial length than the upper bore 62 and contains the annular groove 52 which is spaced a short distance below a ledge 66 formed at the intersection of the upper and lower bores 62, 64. The lower bore 64 has a diameter which is greater than that of the upper bore 62; therefore, the ledge 66 faces in a downward direction. The primary purpose of the ledge 66 is to serve as a stop or an alignment guide for proper axial positioning of the upper end portion 44 in the passageway 42 when the inner socket 54 is inserted into the outer socket 50. As seen in FIGS. 5 and 6, the upper edge 58 abuts the ledge 66.

IMPROVED TOP NOZZLE LOCKING AND UNLOCKING FEATURES

Referring now to FIG. 2 through 7, there is also seen the improved features of the present invention being associated with the locking tube 48 and the guide thimble upper end portion 44. The locking tube 48 has upper and lower portions 68, 70 and is mounted within the guide thimble upper end portion 44 for movement therealong between an upper locking position, as seen in FIG. 5, and a lower unlocking position, as seen in FIG. 6. When the locking tube 48 is at its upper locking position, its upper portion 68, which is an elongated tubular body having a generally uniform diameter, is located coextensive with the inner and outer sockets 54, 50 for retaining the inner socket 54 seated within the outer socket 50 and thereby maintaining the adapter plate 40 and the guide thimble upper end portion 44 in locking engagement. On the other hand, when the locking tube 48 is at its lower unlocking position, its upper portion 68 is located below the inner and outer sockets 54, 50 for allowing unseating of the inner socket 54 from the outer socket 50 and thereby release of the adapter plate 40 from the guide thimble upper end portion 44.

The improved features of the present invention relate to cooperating means, generally designated 72 and 74, defined on the guide thimble upper end portion 44 and on the lower portion 70 of the locking tube 48 for retaining the locking tube 48 at either of its upper position (FIG. 5) or its lower position (FIG. 6) within the guide thimble upper end portion 44. The cooperating means 72 on the guide thimble upper end portion 44 includes a pair of upper and lower circumferential bulges 76, 78 which are located below the adapter plate 40 when the inner socket 54 of the guide thimble upper end portion 44 is seated in locking engagement within outer socket 50 of the adapter plate passageway 42. The upper and lower bulges 76, 78 are axially spaced from one another along the guide thimble upper end portion 44 such that the upper bulge 76 is located to retain the locking tube 48 at its upper locking position, while the lower bulge 78 is located to retain the tube 48 at its lower unlocking position.

Figure 3:
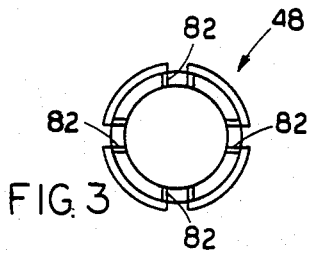
FIG. 3 is a bottom plan view, as seen along line 3—3 of FIG. 2, looking up from beneath the push-down locking tube which constitutes one of the improved features of the present invention.
Figure 4:
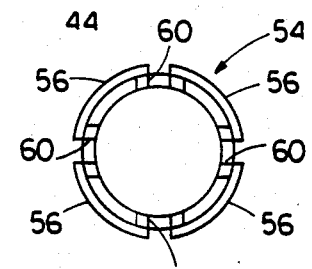
FIG. 4 is a top plan view, as seen along line 4—4 of FIG. 2, looking down on the top of the upper end portion of a guide thimble.

The cooperating means 74 on the locking tube 48 includes a circumferential bulge 80 defined on the lower portion 70 of the locking tube 48 which is seatable in either of the upper and lower circumferential bulges 76, 78 defined on the guide thimble upper end portion 44. In addition thereto, the cooperating means 74 on the locking tube 48 further includes means defining at least one, but preferably, as seen in FIG. 3, four slots 82 in the locking tube 48 extending axially upwardly along the lower portion 70 of the locking tube 48 from a lower edge 84 thereof. The slots 82 allow radial compression and expansion of the lower portion 70 of the locking tube 48 upon movement of the locking tube between and positioning of the tube at its upper and lower positions for seating and unseating of the circumferential bulge 80 of tube into and from the respective upper and lower circumferential bulges 76, 78 of the guide thimble upper end portion 44.

To remove the top nozzle 22 from the guide thimbles 14, each locking tube 48 is moved from its upper locking position, as seen in FIG. 5, wherein each outer socket 50 of the adapter plate and each inner socket 54 of the guide thimble upper end portion 44 are maintained in locking engagement, to its lower unlocking position, as seen in FIG. 6. When each locking tube 48 is in its lower position of FIG. 6, the inner socket 54 is now unobstructed by the upper portion 68 of the locking tube and free to collapse inwardly and release its engagement with the outer socket 50 when the adapter plate 40 is lifted upwardly from the guide thimble 14 to the position seen in FIG. 7. The top nozzle 22 is remounted on the guide thimbles 14 by performing the above steps in reverse.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a reconstitutable fuel assembly including a top nozzle with an adapter plate having at least one passageway, at least one guide thimble with an upper end portion, and an attaching structure for mounting said top nozzle adapter plate in releasable locking engagement upon said guide thimble upper end portion, the improvement which comprises:

(a) a locking tube mounted within said guide thimble upper end portion for movement relative thereto between an upper locking position wherein said adapter plate and guide thimble upper end portion are maintained in said locking engagement and a lower unlocking position wherein said adapter plate is releasable from said guide thimble upper end portion; and (b) cooperating means defined on said locking tube and said guide thimble for releasably retaining said locking tube at either of said upper and lower positions in said guide thimble.

2. The reconstitutable fuel assembly as recited in claim 1, wherein said cooperating means on said guide thimble includes:

a pair of upper and lower circumferential bulges defined on said guide thimble upper end portion and located below said adapter plate when the latter is in locking engagement upon said guide thimble upper end portion, said bulges being axially spaced from one another along said guide thimble upper end portion such that said upper bulge is located to retain said locking tube at its upper locking position and said lower bulge is located to retain said locking tube at its lower unlocking position.

3. The reconstitutable fuel assembly as recited in claim 1, wherein said cooperating means on said locking tube includes:

a circumferential bulge defined on a lower portion of said locking tube which is seatable in said cooperating means on said guide thimble for retaining said locking tube at either of said upper and lower positions in said guide thimble.

4. The reconstitutable fuel assembly as recited in claim 1, wherein said cooperating means on said locking tube includes:

means defining at least one slot in said locking tube extending axially upwardly along a lower portion of said locking tube from a lower edge thereof, said slot allowing radial compression and expansion of said lower portion of said locking tube for facilitating movement of said locking tube between and positioning of said tube at its upper and lower positions.

5. The reconstitutable fuel assembly as recited in claim 2, wherein said cooperating means on said locking tube includes:

a circumferential bulge defined on a lower portion of said locking tube which is seatable in either of said upper and lower circumferential bulges defined on said guide thimble upper end portion.

6. The reconstitutable fuel assembly as recited in claim 5, wherein said cooperating means on said locking tube includes:

means defining at least one slot in said locking tube extending axially upwardly along said lower portion of said locking tube from a lower edge thereof, said slot allowing radial compression and expansion of said lower portion of said locking tube upon movement of said locking tube between and positioning of said tube at its upper and lower positions for seating and unseating of said circumferential bulge of said locking tube into and from said respective upper and lower circumferential bulges of said guide thimble upper end portion.

7. In a reconstitutable fuel assembly including a top nozzle with an adapter plate having at least one passageway, at least one guide thimble with an upper end portion, and an attaching structure having an outer socket defined in said adapter plate passageway and an inner socket defined in said guide thimble upper end portion and capable of seating within said outer socket for mounting said top nozzle adapter plate in releasable locking engagement upon said guide thimble upper end portion, the improvement which comprises:

(a) a locking tube having upper and lower portions and being mounted within said guide thimble upper end portion for movement therealong between an upper locking position wherein said upper tube portion is located coextensive with said inner and outer sockets for retaining said inner socket seated within said outer socket and thereby maintaining said adapter plate and guide thimble upper end portion in said locking engagement and a lower unlocking position wherein said upper tube portion is located below said inner and outer sockets for allowing unseating of said inner socket from said outer socket and thereby release of said adapter plate from said guide thimble upper end portion; and (b) cooperating means defined on said lower portion of said locking tube and on said guide thimble for releasably retaining said locking tube at either of said upper and lower positions in said guide thimble.

8. The reconstitutable fuel assembly as recited in claim 7, wherein:

said upper portion of said locking tube is an elongated tubular body having a generally uniform diameter.

9. The reconstitutable fuel assembly as recited in claim 7, wherein said cooperating means on said guide thimble includes:

a pair of upper and lower circumferential bulges defined on said guide thimble upper end portion and located below said adapter plate when said inner socket of said guide thimble upper end portion is seated in locking engagement within said outer socket of said adapter plate passageway, said bulges being axially spaced from one another along said guide thimble upper end portion such that said upper bulge is located to retain said locking tube at its upper locking position and said lower bulge is located to retain said locking tube at its lower unlocking position.

10. The reconstitutable fuel assembly as recited in claim 9, wherein said cooperating means on said locking tube includes:

a circumferential bulge defined on said lower portion of said locking tube which is seatable in either of said upper and lower circumferential bulges defined on said guide thimble upper end portion.

11. The reconstitutable fuel assembly as recited in claim 10, wherein said cooperating means on said locking tube includes:

means defining at least one slot in said locking tube extending axially upwardly along said lower portion of said locking tube from a lower edge thereof, said slot allowing radial compression and expansion of said lower portion of said locking tube upon movement of said locking tube between and positioning of said tube at its upper and lower positions for seating and unseating of said circumferential bulge of said locking tube into and from said respective upper and lower circumferential bulges of said guide thimble upper end portion.

12. In a reconstitutable fuel assembly including a top nozzle with an adapter plate having at least one passageway, at least one guide thimble with an upper end portion, and an attaching structure for mounting said top nozzle adapter plate in releasable locking engagement upon said guide thimble upper end portion, a method of locking said top nozzle adapter plate on and unlocking it from said guide thimble upper end portion comprising the steps of:

(a) selectively moving a locking tube within said guide thimble upper end portion to an upper locking position wherein said adapter plate and guide thimble upper end portion are maintained in said locking engagement; and (b) selectively moving said locking tube within said guide thimble upper end portion to a lower unlocking position displaced below said upper locking position wherein said adapter plate is releasable from said guide thimble upper end portion.

* * * * *